(12) United States Patent
Jernigan

(10) Patent No.: US 9,654,924 B2
(45) Date of Patent: *May 16, 2017

(54) SYSTEM AND METHOD FOR DEVICE-CENTRIC LOCATION DETECTION AND GEOFENCING

(71) Applicant: two forty four a.m. LLC, Santa Clara, CA (US)

(72) Inventor: Charles Carter Jernigan, Santa Clara, CA (US)

(73) Assignee: two forty four a.m. LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/937,193

(22) Filed: Nov. 10, 2015

(65) Prior Publication Data

US 2016/0066146 A1  Mar. 3, 2016

Related U.S. Application Data

(63) Continuation of application No. 13/834,389, filed on Mar. 15, 2013, now Pat. No. 9,215,560.

(60) Provisional application No. 61/670,744, filed on Jul. 12, 2012.

(51) Int. Cl.
*H04W 24/00* (2009.01)
*H04W 4/02* (2009.01)

(52) U.S. Cl.
CPC .............. *H04W 4/021* (2013.01); *Y02B 60/50* (2013.01)

(58) Field of Classification Search
CPC ..... H04W 76/007; H04W 64/00; H04W 4/02; H04W 48/04; H04W 84/18; H04W 88/06; H04M 1/72519; G01S 19/41; G01S 5/14

USPC ........... 455/404.1, 414.1, 456.1–457, 550.1, 455/552.1, 553.1, 41.2, 41.3; 342/357.31, 342/464

See application file for complete search history.

(56) References Cited

U.S. PATENT DOCUMENTS

| 6,208,297 | B1* | 3/2001 | Fattouche | G01S 5/0009 342/450 |
| 6,466,938 | B1 | 10/2002 | Goldberg | |
| 6,611,687 | B1 | 8/2003 | Clark et al. | |
| 8,195,190 | B1 | 6/2012 | Hou | |
| 8,265,613 | B2* | 9/2012 | Brisebois | G06Q 20/202 455/404.1 |
| 8,270,368 | B2* | 9/2012 | Hirano | H04W 36/0083 370/331 |
| 8,862,137 | B2* | 10/2014 | Eskicioglu | 370/328 |
| 8,879,607 | B2 | 11/2014 | Skarp | |
| 9,066,464 | B2* | 6/2015 | Schmidt | A01B 69/00 |

(Continued)

*Primary Examiner* — Steve D Agosta
(74) *Attorney, Agent, or Firm* — Nields, Lemack & Frame, LLC

(57) ABSTRACT

A system and a plurality of methods for location detection are disclosed. In some cases, the user's present location is represented by a circle, having a center and a radius, where the radius is indicative of the accuracy of the present location. The desired destination location, or geofence, is also defined as a circle, having a center and a radius. The various methods disclosed are used to determine when a user has entered or exited the geofence. In some embodiments, these methods attempt to minimize power consumption or another parameter. In another embodiment, the methods attempt to achieve the highest degree of accuracy possible or required for the task.

9 Claims, 4 Drawing Sheets

(56) References Cited

U.S. PATENT DOCUMENTS

| | | | |
|---|---|---|---|
| 2002/0094820 A1* | 7/2002 | Keranen | H04W 64/00 455/456.5 |
| 2003/0013452 A1* | 1/2003 | Hunt | H04W 16/32 455/449 |
| 2004/0203863 A1 | 10/2004 | Huomo | |
| 2005/0037775 A1 | 2/2005 | Moeglein et al. | |
| 2005/0048972 A1* | 3/2005 | Dorenbosch | H04W 36/32 455/436 |
| 2005/0151686 A1 | 7/2005 | Ali et al. | |
| 2006/0009238 A1 | 1/2006 | Stanco et al. | |
| 2008/0146226 A1* | 6/2008 | Claussen | H04W 36/04 455/435.1 |
| 2008/0254797 A1* | 10/2008 | Achtari | H04W 36/0083 455/436 |
| 2009/0170528 A1 | 7/2009 | Bull et al. | |
| 2010/0159949 A1 | 6/2010 | Selgert et al. | |
| 2011/0009102 A1 | 1/2011 | Herraiz et al. | |
| 2012/0115512 A1 | 5/2012 | Grainger et al. | |
| 2012/0310527 A1* | 12/2012 | Yariv | H04W 4/021 701/426 |
| 2013/0137450 A1 | 5/2013 | Dai et al. | |
| 2013/0143595 A1 | 6/2013 | Moshfeghi | |

\* cited by examiner

SYSTEM AND METHOD FOR DEVICE-CENTRIC LOCATION DETECTION AND GEOFENCING

This application is a continuation of U.S. patent application Ser. No. 13/834,389 filed Mar. 15, 2013, which claims priority of U.S. Provisional Patent Application Ser. No. 61/670,744, filed Jul. 12, 2012, the disclosures of which are incorporated herein by reference in its entirety.

BACKGROUND

The prevalence of mobile devices, such as phones, with built-in location detection has spurred the advent of many new applications. For example, software applications currently exist which detect a mobile device's location, and based on that location, deliver customized content to that device.

For these applications to be effective, location detection must be reliable. For example, such an application should be able to distinguish between standard user use cases, such as home, work, school, church, and movie theaters. Typically, these predetermined geographic areas are referred to as geofences. A geofence could be an arbitrary area, or may be associated with a particular location, such as a person's home or business address. In some embodiments, a geofence is defined as a circular region having a center and a radius. This center may be referenced by its latitude and longitude or by using a different coordinate system.

For the purpose of this disclosure, a location within a coordinate system, such as a latitude and longitude, will be known as an "absolute location." In the absence of a coordinate system, it may be possible to determine a "relative location." A relative location is the position of the device relative to a reference point whose absolute location may not be known. For example, a mobile device could detect being in a car based on the presence of the car's Bluetooth signal. The car's absolute position may move, however the device still knows that it is within a car. Other technologies may be used for relative location, including nearby Wi-Fi access points, nearby cell towers, ultrasonic signals detected by a mobile device microphone, NFC tags, light detected by a mobile device's camera, and the like.

Absolute location detection techniques use various different technologies to determine a device's location, including cell towers, Wi-Fi access points, GPS, Galileo, and GLONASS navigation satellites and other signals. Each of these technologies has its own strengths and weaknesses. Many people tend to think of these technologies as having increased levels of precision and accuracy. For example, it is assumed that GPS is better than Wi-Fi, which is better than cell towers. However, in reality, the perceived device location from each of these different technologies may be inconsistent. Referring to FIG. 1, in one exercise, a mobile device was placed at the location marked with an "X." FIG. 1 shows the perceived device location, as determined by GPS, Skyhook Wi-Fi location data, Google Wi-Fi location data, and Google cell tower location data. Skyhook and Google are examples of entities which maintain databases of the estimated positions of cell towers and Wi-Fi access points.

As mentioned above, each of these technologies has strengths and weaknesses. Each will be described in more detail below.

There are two primary cellular network types, GSM and CDMA. Verizon and Sprint have traditionally used CDMA, while T-Mobile and AT&T have traditionally used GSM. Outside of the United States, GSM has been more popular. The 4G LTE networks being deployed now are based on GSM standards.

Regardless of the underlying cell technology, a mobile device communicates with a cell tower for voice, SMS, and data. For the most part, cell towers are stationary and do not move. Furthermore, each cell tower has a unique identifier. Although the range of GSM cell towers goes up to thirty-five kilometers, towers are usually a few kilometers apart.

If the latitude/longitude of a cell tower is known, then a device connected to that tower must be roughly in the same location as the tower. This reasoning describes how cell towers can be used for device-centric location detection. Cell tower location databases from Google and Skyhook contain information about where the cell towers are actually located. In addition, some CDMA cell towers actually transmit their own location without needing to connect to a database. Because cell towers can have a range of many kilometers, cell tower sensor locations are very inaccurate, typically 2,000 meters or worse.

In addition, even though a mobile device remains stationary, it may frequently switch between several different towers which are all located within range.

Furthermore, a strong cell signal will not improve location accuracy. Whether the mobile device has 1 or 5 bars, the accuracy based on cell towers is still on the order of 2,000+ meters. Similarly, being connected to 2G versus 3G versus 4G will not inherently increase location accuracy. In fact, 4G can actually reduce accuracy, because carriers are still enhancing their 4G deployments and 4G towers are more spread apart.

Determining the location of a mobile device based on cell tower location typically requires little power from the mobile device. Since the mobile device is already connected to the cell network, determining cell location happens quickly and passively. The only active part of this process connects to a cloud-based service, such as Google or Skyhook, to determine the actual location of the tower if that information was not already cached.

However, cell tower location data can be unreliable due to inaccuracies in the cell databases. Thus, sometimes cell tower location data can be completely wrong.

Some cell carriers also offer network-centric location detection of mobile devices. These network-centric systems rely on similar principles, i.e. that a device is geographically near cell towers it can communicate with.

In summary, cell tower location detection is inaccurate (2,000 meters), requires little power, works indoors and outdoors, as long as there is cell service, and can sometimes be completely wrong.

Similar to cell towers, Wi-Fi access points are usually stationary, and each Wi-Fi access point has a unique identifier that it broadcasts. Wi-Fi has much shorter range than cell service, usually around thirty meters.

A mobile device does not need to connect to a Wi-Fi access point to detect its presence. If the latitude/longitude of a detected Wi-Fi access point is known, then a mobile device near that Wi-Fi access point must be roughly in the same location as the access point.

Google and Skyhook both operate databases of Wi-Fi access points that are used to determine location. Google crowdsources its database by performing Wi-Fi scans from Android handsets. In addition to crowdsourcing, Skyhook populates its database by driving vehicles equipped with GPS and Wi-Fi scanners. The exact location of the Wi-Fi access point is often not known by Google or Skyhook, but is rather estimated by taking multiple scans from different sides surrounding the access point. Because of these estimations, Wi-Fi sensor locations are usually accurate to about 100 meters.

Determining the location of a mobile device based on Wi-Fi access point location typically requires low to medium power from the mobile device. Unlike cell towers, Wi-Fi access points can move, temporarily causing inaccurate location. It is believed that about 20% of all Wi-Fi access points move per year. This means that from time to time, a Wi-Fi based location can be completely wrong.

Wi-Fi location detection works in any location where there are Wi-Fi access points. Wi-Fi access points are available at most homes, offices, schools, and throughout urban environments. Churches are one of the few relatively common buildings where Wi-Fi often is not visible.

In summary, Wi-Fi sensor locations are typically accurate (100 meters), require medium power, work anywhere there are Wi-Fi access points, and can sometimes be completely wrong.

GPS is entirely different from cell and Wi-Fi based location technology. The mobile device's GPS receiver picks up signals from a constellation of GPS satellites. While this application uses the term "GPS," it is understood that there are various satellite-based navigation systems. For example, Europe utilizes a navigation system codenamed Galileo, while Russia has a navigation system known as GLONASS. All of these navigation systems are within the scope of the disclosure and the invention is not limited to only the U.S. based GPS satellite system. Thus, the term "GPS" is intended to denote any satellite-based navigation system and is not limited to any particular embodiment.

To determine its position, a GPS receiver must know where the GPS satellites are. There are two parts to this:
1. almanac data provides a rough estimate of satellite positions, while
2. ephemeris data provides a precise satellite position. The almanac allows a GPS receiver to approximate the positions and velocities of the satellites, and a GPS receiver uses this information to aid the determination of satellite visibility during acquisition of GPS satellite signals. The almanac is updated weekly by GPS Control, although previously downloaded almanac data is valid for a number of months. GPS satellites transmit almanac data continuously, although it takes about 12.5 minutes for a GPS receiver to completely download the almanac. If a GPS receiver is fresh from the factory or has not been used for several months, the almanac data will need to be downloaded and a lengthy time to first fix is expected. All GPS satellites transmit the same almanac data, which makes an almanac download more robust than downloading ephemeris data, which is discussed next.

Each satellite broadcasts "ephemeris" data, which provides the GPS receiver with the exact location of that particular satellite. Ephemeris data is unique to each satellite. A GPS receiver needs to receive ephemeris data from at least four satellites in order to determine its own location because there are four variables that make up a GPS sensor location: longitude, latitude, altitude, and time. Once ephemeris data is received by the GPS receiver, that data is valid for about four hours. Note, however, that different GPS satellites come in and out of view over time, effectively reducing the time when cached ephemeris data is useful.

Transmission of ephemeris data requires a full uninterrupted thirty second transmission cycle. If the GPS receiver turns on right after an ephemeris transmission cycle has already begun, the receiver must then wait until the beginning of the next cycle, which is up to thirty seconds away, before it can begin the thirty second download. Thus, it may take up to sixty seconds to acquire this information. It is also important for the GPS receiver to remain stationary when downloading ephemeris data. If the receiver is moving, it might briefly lose the GPS signal due to objects like buildings or trees blocking the satellites from view, and then it must start over at the next thirty second cycle. Therefore, in ideal conditions (e.g. clear view of the sky), a GPS receiver requires at least sixty seconds to guarantee a sensor location. In typical conditions, it can take several minutes for a GPS receiver to get an uninterrupted signal from four satellites.

Modern GPS receivers support out-of-band delivery of GPS almanac and ephemeris data via an Internet connection, which is sometimes called A-GPS. This ephemeris data allows a GPS receiver to get a sensor location more quickly, within about twenty seconds. However these quickly obtained sensor locations are often less accurate. In some tests, it has been observed that GPS confidently gives sensor locations with a small error radius that are actually up to fifty kilometers away from the correct location. Correctness of the sensor locations tends to improve the longer the GPS receiver is on.

Because of the slow acquisition time and low accuracy on startup, GPS works best for continuous tracking of location, such as providing driving directions. However, monitoring GPS continuously will drain the battery on a mobile device very quickly. In some cases, the battery may be drained within a few hours.

While the theoretical accuracy of GPS is high, the practical accuracy in the context of a geofencing implementation on a mobile device is quite low because of the long warmup period for more correct sensor locations. In summary, GPS is accurate (100 meters), requires high power, only works outdoors, and has a slow acquisition time.

Thus, all location detection systems currently employed have deficiencies and benefits. It would be advantageous if there existed a system and method for location detection that accurately determined the location of the mobile devices in a short amount of time, and without consuming a large amount of power.

SUMMARY

A system and a plurality of methods for location detection are disclosed. In some cases, the user's present location is represented by a circle, having a center and a radius, where the radius is indicative of the accuracy of the present location. The desired destination location, or geofence, is also defined as a circle, having a center and a radius. The various methods disclosed are used to determine when a user has entered or exited the geofence. In some embodiments, these methods attempt to minimize power consumption or another parameter. In another embodiment, the methods attempt to achieve the highest degree of accuracy possible or required for the task.

In one embodiment, the method for determining when a user enters a predetermined region, where the user's present location is represented by a first circle having a first center and a first radius, where the first radius is indicative of the accuracy of the present location and the predetermined region is represented by a second circle having a second center and a second radius, comprises using a device in communication with a plurality of location sensors; categorizing the plurality of location sensors into two or more groups based on one or more characteristics; utilizing location sensors of a first group to determine the user's present location; and utilizing location sensors of a second group to determine the user's present location, only if the first group does not meet a predetermined criteria.

In another embodiment, a method for determining when a user enters a predetermined region comprises using a device in communication with a plurality of location sensors; creating a database comprising location sensors, accuracy of the location sensors and absolute location of the sensors; communicating with a particular location sensor to determine when the user enters the predetermined region, wherein the location sensor is selected based on information in the database.

In a third embodiment, a method for determining when a user enters and exits a predetermined region comprises using a first criteria based on the first center, the first radius, the second center and the second radius to determine when the user has entered the predetermined region; and using a second criteria based on the first center, the first radius, the second center and the second radius, different than the first criteria, to determine when the user has exited the predetermined region.

In a fourth embodiment, a method for determining when a user enters and exits a predetermined region comprises determining a distance between the user's present location and the predetermined region; sampling one or more location sensors at a frequency based on the determined distance to update the user's present location; and repeating the determining and sampling steps.

In a fifth embodiment, a method for determining when a user enters and exits a predetermined region comprises sampling one or more location sensors to update the user's present location; using a non-location sensor to detect the user's present location has changed; and repeating the sampling step if a change in the user's present location is detected.

In a sixth embodiment, a method for determining when a user enters and exits a predetermined region comprises using a device in communication with a plurality of location sensors; obtaining a respective user's present location from each of the plurality of location sensors; comparing the respective user's present locations obtained from each of the location sensors to the predetermined region; and determining the user's present location based on the comparison.

In a seventh embodiment, a method for determining when a user enters and exits a predetermined region comprises using a device in communication with a plurality of location sensors; obtaining a respective user's present location from each of the plurality of location sensors; updating each of the respective user's present locations based on elapsed time since each respective user's present location has been obtained and an estimated speed for the user; and determining the user's present location based on the plurality of updated respective user's present locations.

DETAILED DESCRIPTION OF INVENTION

The present invention is a system designed to calculate the location of a user's device and determine, based on the calculated location, whether that device is within a specific geofence. A geofence is a predefined geographic area. Although a geofence can be an arbitrary area, throughout this disclosure, a geofence will be defined as a circular region, having a center with a specific latitude and longitude and a radius defining the outer limits of the geofence. The system may be a software application executing on a computing device. Alternatively, the system may be a hardware based device capable of performing the functions described herein.

Figure 2:
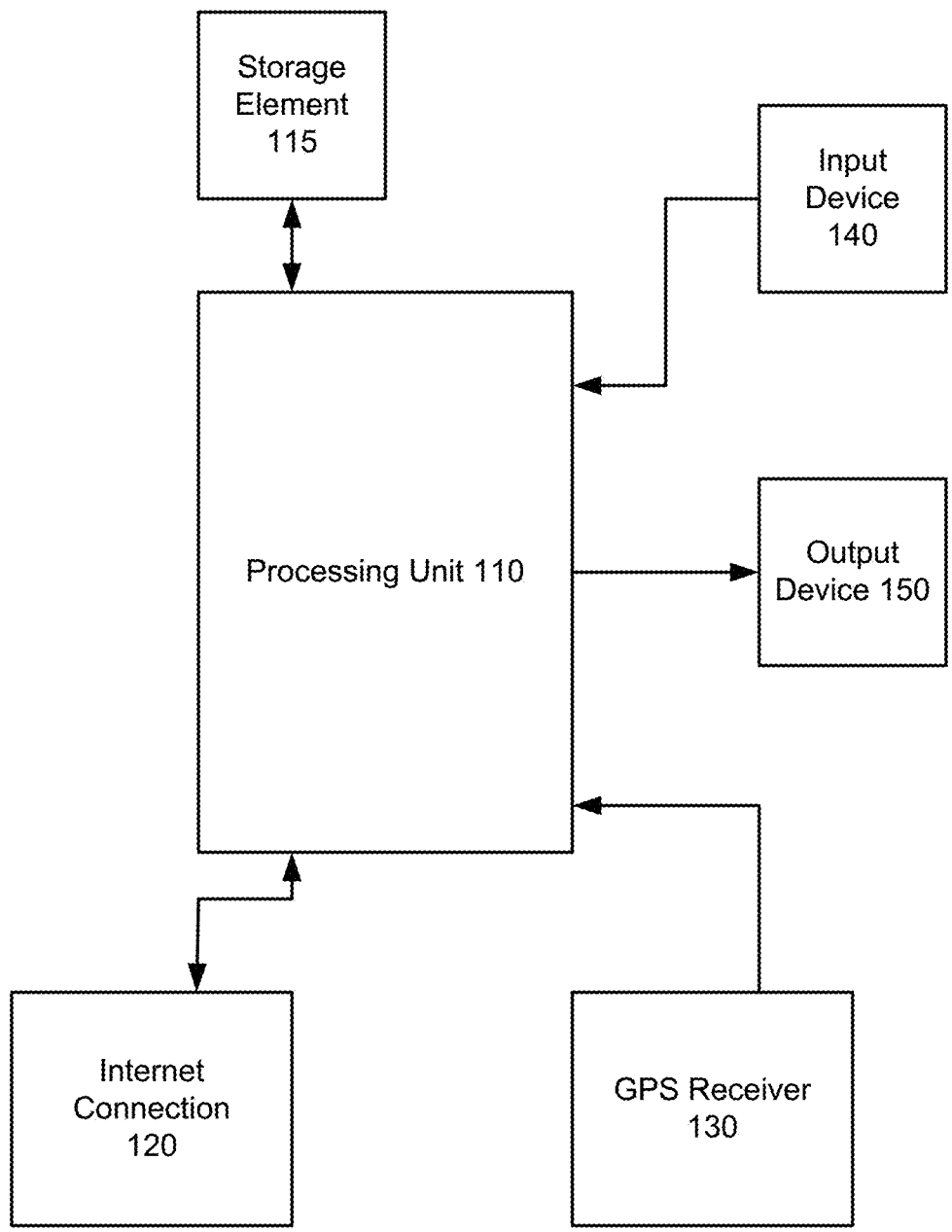
FIG. 2 shows a block diagram of a mobile device on which the present invention can be executed.

FIG. 2 shows a representative block diagram of a mobile device 100 on which the present system may reside. In some embodiments, the system is a software application which executes on the mobile device 100. In some embodiments, the mobile device may have telephony features, although this is not a requirement. The mobile device typically has a processing unit 110, which is used to execute instructions. The processing unit 110 may be physically implemented in a variety of technologies. For example, it may be a general-purpose processor, executing a set of instructions from an internal or external storage device. In another embodiment, a dedicated hardware device having embedded instructions or state machines may be used to perform the functions described. Throughout this disclosure, the terms "control logic" and "processing unit" are used interchangeably to designate an entity adapted to perform the set of functions described.

The processing unit 110 may have its own local storage element 115, which contains instructions to execute and may contain local information and other status data. This storage element may be RAM or DRAM. In addition, at least a portion of this storage element 115 may be non-volatile, such as ROM, FLASH ROM, Solid State Disk, or the like. The processing unit 110 may also be connected to the Internet, such as via a Wi-Fi or cell connection 120. Data received via the Internet connection 120 may be used to access information, such as Google and Skyhook databases. In some embodiments, this type of information may be stored locally in the storage element 115. The device 100 may include a GPS receiver 130, which is used to gather ephemeris data from GPS satellites. The mobile device 100 may include an input device 140, such as a keyboard or touchscreen, and an output device 150, such as a LCD display.

The software application includes the instructions and software capable of performing the functions described herein. The software may be written in any suitable programming language and the choice is not limited by this disclosure. Additionally, all applications and software described herein are computer executable instructions that are contained on a computer-readable media. For example, the software and applications may be stored in a read only memory, a rewritable memory, or within an embedded processing unit. The particular processing unit on which this software executes is application dependent and not limited by the present invention.

The processing unit 110 may also be used to execute other applications, which may or may not be related to the present invention. In some embodiments, the determination of location within a geofence is relayed to other applications, which use this information for their own purposes. In some embodiments, the other applications interface with the present invention and use the present invention to supply location information, which is then used by the other applications.

The design of the present geofencing system is broken down into three key components:

1) the detector,
2) the matcher, and
3) the scheduler.

The detector obtains sensor locations from various location sensors. The matcher decides whether a sensor location is inside of or outside of a particular geofence. The scheduler decides when to activate the detector next. Each of these components will be described in more detail below.

Detector

The detector is used to determine the location of the mobile device, based on information received from one or more location sensors. Currently, the three primary ways to determine a sensor location are cell, Wi-Fi, and GPS. Each of these technologies has advantages and disadvantages as described earlier. The present invention utilizes a hybrid approach to optimize for best accuracy, performance, and battery life.

Additional location sensor sources can be incorporated in the present invention, and the disclosure is not limited to those location sensor sources described herein. As new location sensor sources become available, they can be utilized by the present system.

Detection Modes

There are three approaches to obtaining a sensor location. These approaches are referred to as:
1) active one-shot,
2) active continuous, or
3) passive.

Active one-shot detection enables a location sensor for a brief period of time until the sensor returns the current location, the sensor reports an error, or the sensor times out. Active one-shot detection has a low impact on the battery, because it only happens once, for a limited period of time.

In contrast, active continuous detection enables the location sensor continuously. One example of active continuous detection is the use of a handheld GPS unit or the map application on a mobile device, where the application continuously monitors the GPS receiver. As expected, active continuous detection has a significant impact on the battery but provides the most up-to-date results. In some embodiments, active continuous may be achieved by continuously performing one-shot detection, i.e. starting a new one-shot detection as soon as the previous one ends.

Passive is a mode where an application can passively receive data from the sensors serendipitously whenever another application on the mobile device happens to be using that sensor in either active one-shot or active continuous mode. For example, if the present invention were running in the background and the user opens the Google Maps application, the present invention could passively receive the same sensor data that Google Maps was actively receiving. While passive mode does not use any additional battery power, the application receiving the passive data has no ability to determine when the next passive result might be delivered.

The present invention relies primarily on active one-shot detection and secondarily on passive detection, although continuous active detection may be used in some embodiments.

The following section describes various one-shot active detection systems. In some embodiments, the active one-shot detection system is broken down into three components:
1) OneShotContinuationCallback: a callable routine that coordinates with the client that wants a sensor location,
2) LocationDetector: a routine or application that receives the request for location, mediates between the various location data sensors and returns location information via the OneShotContinuationCallback, and
3) the individual location sensors, such as GPS, Google, Skyhook, etc.

Figure 1:
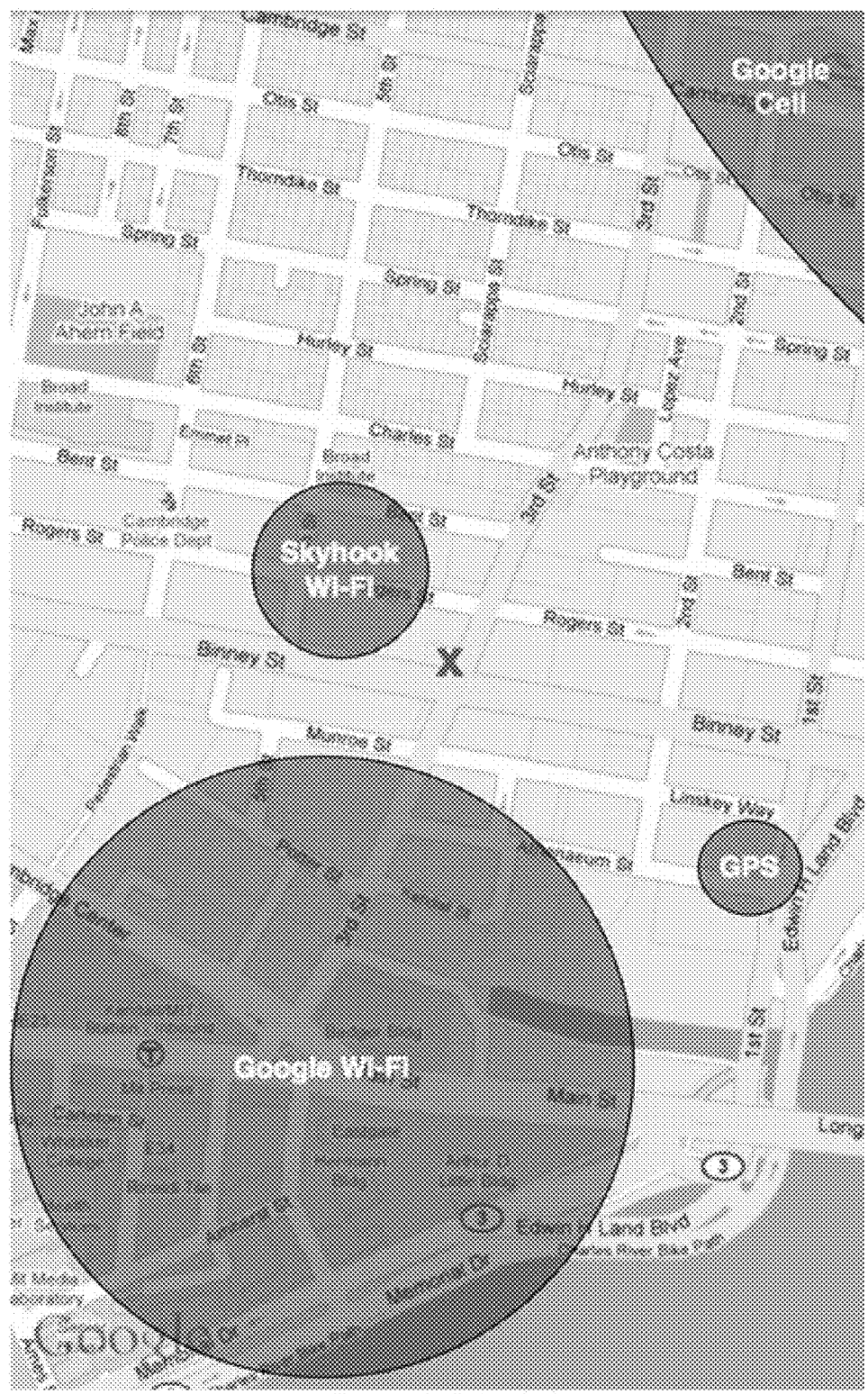
FIG. 1 shows a map with the perceived location of a mobile device according to various location detection technologies.

To use the system, a client would create a OneShotContinuationCallback, pass that request to the LocationDetector, and then wait to receive location results through the OneShotContinuationCallback. Internally, the LocationDetector consults a variety of different location sensors and selects one or more sensor locations to deliver to the OneShotContinuationCallback. Each result is delivered as an absolute position, having a latitude, and a longitude, and an accuracy. Thus, like a geofence, a sensor location as determined by the LocationDetector is defined as a circular region having a center and a radius, where the radius is an indication of its accuracy. The accuracy typically represents the radius of uncertainty. Thus, larger values are more uncertain, or inaccurate, than lower values. Therefore, in the present disclosure, when an accuracy is increased, this implies that the system is increasing the uncertainty associated with that location, or making it more inaccurate. FIG. 1 shows an example of the location data returned by various sensors.

Location Sensors

The location sensors used by the present invention are:
1) Wi-Fi Calibration: an internal Wi-Fi location calibration system developed as part of the present invention. The Wi-Fi Calibration sensor allows the user of the present invention to input the latitude, longitude, and MAC address of a Wi-Fi access point. When the Wi-Fi Calibration sensor detects a stored Wi-Fi access point during a Wi-Fi scan, it reports the stored latitude and longitude as the current location of the device.
2) Skyhook XPS: Skyhook's hybrid cell, Wi-Fi, and GPS system.
3) Skyhook WPS: Skyhook's hybrid cell and Wi-Fi system
4) GPS.
5) Google network: Google's cell and Wi-Fi system.
6) CDMA cell: Cell tower location broadcast by the CDMA network.

Before the individual location sensors return a sensor location to the LocationDetector, preprocessing may occur, preprocessing can be varied, the following discloses an illustrative set of rules. Of course, other rules can also be used without departing from the spirit of the invention. In some embodiments, this preprocessing occurs within the LocationDetector, rather than within the individual sensors.

In some embodiments, the reported accuracy of the sensor location may be adjusted based on known limitations of the sensor. For example, GPS sensor locations may be given a minimum accuracy, such as 100 meters, in order to account for GPS sometimes returning overly ambitious accuracy estimates. Thus, if the GPS sensor reports an accuracy of 20 meters, this accuracy may be increased during the preprocessing stage. This is often important in mobile devices, such as phones, which may have reduced GPS accuracy due to design tradeoffs made by the manufacturer to fit many different components into the device's enclosure.

In some embodiments, the accuracy returned by the sensor may be adjusted to achieve higher confidence intervals. For example, the Google network sensor returns sensor locations whose accuracy confidence is within 1-sigma, while the Skyhook WPS and XPS sensors return sensor locations whose accuracy confidence is within 2-sigma. By increasing the size of the Google network location (i.e. increasing the accuracy), the confidence improves above 1-sigma.

In some embodiments, the several locations provided by the sensor may be discarded until a location of a certain quality is determined. For example, the accuracy of GPS sensor locations tends to improve over time as the GPS receiver is able to receive updated ephemeris data from the GPS satellites.

In some embodiments, locations provided by a sensor may be discarded until the sensor is in a certain state that provides higher quality results. For example, GPS locations may only be accepted if a four-satellite fix is obtained. Although GPS receivers can determine a sensor location with only three satellites by holding one of the variables (usually altitude) constant, the accuracy of such sensor locations is usually lower. In some embodiments, the mobile device may include a barometer or altimeter, which can be used to estimate the altitude of the mobile device. In this case, by estimating the altitude, it is possible to more accurately determine the sensor location using only three satellites.

Result Selection

As previously described, the LocationDetector may obtain the current location from one or more different sensors. These sensor locations may or may not all agree with each other, so the LocationDetector must determine which of the many sensor location results should be utilized. The following discloses one set of algorithms and rules used to determine the appropriate location sensor to utilize.

In some embodiments, the LocationDetector uses a "mixed mode" approach to picking between locations reported from different sensors. Rather than combining data from several sensors into a hybrid result, the LocationDetector selects one single location as being the best from the different sensor locations.

In such a mixed mode embodiment, a number of different algorithms may be used. In one embodiment, the accuracy of the sensor location is used. For example, the sensor location with the smallest accuracy (i.e. the most accurate) may be selected as best. In another embodiment, the age of the sensor location is used. For example, the newest sensor location may be selected as best.

In another embodiment, a combination of sensor location accuracy and age is used. For example, the locations reported by the various sensors may be ranked according to their accuracy, adjusted for the age of the location and the speed of the device. The accuracy might be increased by some minimum estimated speed such as a human's average walking speed of 1.78816 [meters/second] or the maximum speed the device might be expected to move such as in a vehicle traveling at highway speeds of approximately 30 [kilometers/hour], times the age of the sensor location. The sensor location with the smallest age adjusted accuracy is then accepted as best.

In some embodiments, exceptions may override use of age, accuracy, or age adjusted accuracy. In some embodiments, one sensor may take precedence over other sensors due. The following are example exceptions:

The Wi-Fi calibration sensor may take precedence over other sensors. Because the Wi-Fi calibration sensor data comes from users of the present invention, this override allows the Wi-Fi calibration sensor to act as an override to correct bad data from other sensors.

The cell/Wi-Fi sensor data from one provider (i.e. Skyhook or Google) may take precedence over the cell/Wi-Fi sensor data from another provider. This may be because of a working relationship with one of the providers, wherein that provider updates their database based on feedback more quickly. This may also be because of better perceived or actual accuracy of one provider over the other.

In other embodiments, the LocationDetector returns a hybridized location that combines the results received from several sources. For example, the algorithm may average the latitude, longitude, and radius respectively, and return the average value as the hybrid location. In some embodiments, only a subset of the sensor locations are hybridized together. Consider a scenario where there are several different sensor locations. Most are near each other, while one or more outliers completely disagree with the rest. In some embodiments, these outliers are discarded and only the sensor locations that closely correspond with each other are hybridized.

In other embodiments, the LocationDetector may return multiple results that were obtained from the various location sensors. In some cases, the matcher would select the one or more results which it wishes to use. For example, the matcher may adopt a "greedy" approach, where it checks to see if any of the returned results match a geofence. If a match is found, the matcher uses this location, and the geofence is matched. Because the region inside a geofence is generally smaller than the region outside a geofence, the probability that the greedy algorithm is incorrect is relatively small.

Progressive Deepening

During the entire one-shot location update process, the LocationDetector and the individual data sources frequently send partial sensor locations to the OneShotContinuationCallback for feedback on whether more accurate location data is needed. This feedback is used to drive an artificial intelligence algorithm called progressive deepening, often used in computer game artificial intelligence.

The use of progressive deepening optimizes battery usage for sensor locations. With progressive deepening, the location data sources are checked in a sequence designed to minimize battery usage rather than checking them all simultaneously.

In some embodiments, a progressive deepening algorithm might check cell location first, then Wi-Fi, then GPS, only proceeding to the next technology if the previous location was not perceived to be accurate enough.

In other embodiments, a progressive deepening algorithm may organize sensors together into a series of groups with each group representing certain characteristics such as power usage. These groups may be progressively inclusive, exclusive, or a combination of the two. An example set of progressively exclusive groups might be [cell], [Wi-Fi], and [GPS]. An example set of progressively inclusive groups might be [cell], [cell, Wi-Fi], [cell, Wi-Fi, GPS]. In such an embodiment, the progressive deepening algorithm may check groups one at a time, running the sensors within the group in parallel, only proceeding to the next group if the previous group did not obtain a sensor location perceived to be accurate enough.

In other embodiments, a progressive deepening algorithm may run all sensors in parallel. Such a parallel implementation may then choose the first sensor that returns a location that is perceived to be accurate enough and abort the remaining outstanding sensors.

In other embodiments, a progressive deepening algorithm may run sensors in parallel with a delayed offset. For example, suppose a Wi-Fi location sensor typically obtains a result within four seconds but may take up to twenty seconds to return a result. In some cases, Wi-Fi may take twenty seconds and fail to detect the location of the device, effectively wasting twenty seconds of time. To optimize power usage, some embodiments may check Wi-Fi first but will enable GPS in parallel with Wi-Fi if Wi-Fi does not quickly return a result.

In some embodiments, the progressive deepening search proceeds to the next stage based on the accuracy of the sensor locations obtained. In other embodiments, the progressive deepening search proceeds to the next deepest stage based on the relationship of various sensor locations to each other. For example, if the Google network sensor and the WPS sensor return locations that disagree with each other, the system may progress to checking GPS for corroboration.

In some embodiments, the progressive deepening search may first check sources of relative location data prior to checking sources of absolute location data. In other embodiments, the progressive deepening search may first check sources of absolute location data prior to checking sources of relative location data. In such an embodiment, the progressive deepening search may check the absolute location using cell, Wi-Fi, or GPS prior to determining an even more refined relative location using Bluetooth, NFC, ultrasonic, or other signals.

In other embodiments, even more sophisticated algorithms may be combined with progressive deepening to determine what location sensor technology to use. As described above, a purpose of the present invention is to determine when a user is within a predefined geofence. Thus, the absolute location of the user may be less important than whether the user's location meets the geofence matching criteria. Therefore, these algorithms use information about the geofence to determine which location sensors to utilize. For example, criteria, such as geofence size, may impact which location sensor should be employed.

Selecting Continuation Criteria

Before the active one-shot location update begins, the present invention decides a set of continuation criteria for each geofence. Criteria might include explicitly selecting a specific sensor or implicitly selecting a sensor based on the power usage of the sensor, accuracy of the sensor, whether the sensor requires Internet connectivity, the time the sensor takes to obtain a location, whether the sensor works indoors or outdoors, as well as other dimensions. In one embodiment, the criterion is simply a measure of the sensor's power usage with categories such as LOW, MEDIUM, or HIGH.

In other embodiments, the current battery capacity of the device, or the availability of a power supply (i.e. wall outlet, car adapter, inductive, or integrated solar charger), as denoted by the charging state of the device, may impact the choice of location sensor. For example, if the device is relatively low on battery power, the power consumption criteria may be changed. Similarly, if the device is charging, there may be no penalty to utilizing GPS continuously.

In other embodiments, the activity of the device may impact the choice of location sensor. For example, if the device is in a car, the system might opt to use GPS more frequently because Wi-Fi networks are often not visible on highways. The system might detect that the device is in a car based on the presence of a car dock accessory, a car Bluetooth connection, the speed of the device, or the movement of the device as determined by the accelerometer or other sensors in the device.

In other embodiments, GPS is not used while the device is roaming with data roaming turned off. If data roaming is turned off, then cell and Wi-Fi location sensors will not be able to connect to an Internet database. If the necessary portion of the cell and Wi-Fi location database is not cached on the device, GPS might be the only sensor that would work while roaming. However, when the user is roaming, the user is probably traveling internationally far away from his geofences and would rather save battery life than use GPS. Of course, in other embodiments, GPS is used, as this is the only location detection system that is available.

In one embodiment, the invention checks the radius of each geofence and determines what sensor or power usage requirement would be appropriate to detect that geofence. For example, if a geofence has a radius greater than a predetermined value, such as 2,000 meters or larger, then the criterion is set to LOW power, since high accuracy is not required. Thus, cell tower location detection may be sufficient in these instances. In other embodiments, the invention uses an "oracle," described below, to determine continuation criteria on a per-geofence basis.

Oracle

In some embodiments, the present invention may have some a priori knowledge of what location sensors are available for a given area, as well as the accuracy of those sensors for that area. This prior knowledge may be referred to as an oracle. This oracle may be helpful during initial geofence configuration, as well as during the location detection process.

An oracle can improve the initial configuration of geofences. When a geofence is being configured, the oracle can query its database to determine if it is aware of any location sensors that will work in that location. In one embodiment, the system may automatically configure the size of the geofence based on the expected accuracy available in that area. In another embodiment, the system may automatically balance battery usage and accuracy by configuring the size of the geofence for a lower power sensor, such as cell towers or Wi-Fi, even if a higher power sensor, such as GPS, would also be available with better accuracy. For example, users might prefer a 150-meter geofence that uses lower power Wi-Fi rather than a 50-meter GPS that uses higher power GPS. Although the user has not explicitly opted to use Wi-Fi, this is implied because of the progressive deepening algorithm's attempt to use lower power sensors before using higher power sensors.

In another embodiment, the system might allow the user to select the geofence size but set a minimum size based on expected accuracy in the area. In another embodiment, the system may show the user the expected accuracy cutoffs for location sensors expected to be available in the area, allowing the user to decide which geofence size, and therefore location technology, should be used to detect that geofence.

In addition to improving geofence configuration, an oracle may be helpful during location detection. Consider a user who configures a geofence for work. The oracle may determine in advance that Wi-Fi location detection is available in that area and is sufficient to detect entering this particular geofence. Based on this prior knowledge, the oracle may also determine that it never needs to use GPS to detect entering that geofence.

For example, assume a user has a geofence and enters an area without Wi-Fi coverage, but the cell location overlaps with the geofences. Due to the progressive deepening algorithm, the present invention would likely check both Wi-Fi and GPS because the cell location sensor indicates that the user is close to the geofence. However, the oracle has previously determined that GPS is not needed to detect entering this geofence. Therefore, the present invention can skip GPS location detection and save significant battery.

There are several ways to implement such an oracle. Skyhook and Google both maintain a database of cell towers and Wi-Fi access points for location detection. In one embodiment, these databases are queried to determine the availability and accuracy of cell and Wi-Fi location.

In another embodiment, the present invention utilizes its own Wi-Fi calibration database to act as an oracle.

In another embodiment, a learning algorithm in the present invention builds an oracle database. As the system enters various areas, it determines and saves information regarding the cell, Wi-Fi, GPS, and other signals available in that area. By doing this, the system can create its own database which represents locations (latitude, longitude, accuracy) correlated with the sensor used to determine that location.

In one embodiment, the learning algorithm stores every sensor location obtained in a database. This identifies the latitude, longitude, accuracy, and sensor used to determine the location. To minimize the storage space used, another embodiment may store a limited number of these records. For example, the system may combine many records for the same sensor and same location into a single record. Alternatively, the system may keep a certain number of records or may keep records for a certain amount of time.

In another embodiment, the learning algorithm may keep track of what location sensors were available when a given geofence's state changes between unmatched and matched and vice versa, as this transition state is the most important for geofence detection.

In another embodiment, the user of the invention manually enters information about what location technologies are available to populate the oracle.

In summary, an oracle allows various optimizations. First, the use of an oracle allows geofences to be created with realistic radii based on the location sensors known to be available in that area. Second, the use of an oracle allows the system to decide what location sensors are available for use for a particular geofence. Third, the use of an oracle may allow the system to use only a subset of the location sensors to determine when the geofence is being entered.

Asymmetric Criteria Selection

Different continuation criteria may be used for entering and exiting a geofence. For example, it may be assumed that a geofence defines a user's workplace or home, which is likely indoors. Thus, one approaching a workplace may be assumed to be outdoors, where GPS is available (and the most accurate location sensor). Once a geofence has been entered, then the criterion may be set to MEDIUM power. This addresses the "dungeon" problem. A "dungeon" is defined as an area with little or no cell, Wi-Fi, or GPS availability. Basements, subways, and even churches often have limited coverage for all three of these location technologies. As described in more detail below, a predictive scheduler allows the present invention to detect just when the device is entering the geofence (and is still likely to be outdoors where GPS is more likely to be available). HIGH power, which would permit the use of cell, Wi-Fi, and GPS, can be used to detect entering the geofence. Once inside the geofence, asymmetric algorithms advocate that MEDIUM power, which would permit cell and Wi-Fi, be used because GPS is unlikely to work inside a geofence and therefore polling GPS to detect the exit will significantly drain the battery. Thus, different criteria may be used to determine what location sensors should be used to determine when the geofence has been entered and when it has been exited.

While in some embodiments, the asymmetric algorithm may advocate that GPS not be used, there are other possible embodiments. For example, assume a user drives to work and the predictive scheduler checks GPS just as the device arrives at the work geofence. Once inside the work geofence, GPS is no longer used in order to prevent battery drain due to the asymmetric algorithm described above. When this user leaves work, only cell information is available (as there is typically no Wi-Fi on the highway) and GPS is not used due to the asymmetric algorithm. This suggests that the geofencing algorithms will not detect that the user has left work until the device has moved far enough away for the cell towers to confirm an exit. This could be on the order of 2,000 meters or more.

Several variations of the asymmetric algorithms can be used to address this problem. In one instance, if Wi-Fi is available within the geofence, the system may detect a change in location sensor or accuracy when the device exits the geofence and the Wi-Fi network is no longer available. This change may create an exception to the asymmetric algorithm, such that the system performs a single one-shot GPS check to determine whether the geofence has been exited.

In another instance, the system may monitor the relative signal strength of the cell towers visible within the geofence. A change in that signal strength may create an exception, where the system performs a single one-shot GPS check to determine whether the geofence has been exited.

In another instance, the system may monitor other parameters to determine that the user is in an automobile. The presence of a Bluetooth connection or a car dock, or a reading from an accelerometer may be used to indicate that the user is now in an automobile. This action may create an exception, where the system performs a single one-shot GPS check to determine whether the geofence has been exited.

After determining the criteria, the progressive deepening location search begins.

Caching

In one embodiment, the LocationDetector is stateful and remembers the last sensor location that each individual sensor detected. If a lower power sensor does not detect a change from the previous one-shot location update, the LocationDetector may not use a higher power sensor during a subsequent update. For example, the Skyhook WPS location sensor may have previously detected a 100-meter location (i.e. a location with a 100-meter accuracy) and GPS may have detected a 50-meter location during the same one-shot update. During the next one-shot location update, if the WPS location sensor detects a similar 100 meter location to the previous one-shot location update, then the LocationDetector may opt to either use the new WPS sensor location or the cached GPS sensor location rather than check GPS again.

In some embodiments, the LocationDetector may use various low power non-location sensors on the device to determine whether the device has moved prior to using a higher power location sensor. For example, the Location-Detector may have checked the angle of the device using the accelerometer in the previous one-shot location update. In a subsequent one-shot location update, if the angle of the device is the same, the LocationDetector may assume that the device has not moved, and may not power on any location sensors and may simply return the previously obtained sensor location.

In another embodiment, the LocationDetector may check the altitude of the device using an altimeter or a barometer built into the device. If the altitude of the device is significantly higher than the expected ground level altitude of the device based on the latitude and longitude detected by the location sensors, the LocationDetector might assume that the user is within a tall building. When in a tall building, significant lateral movement beyond the footprint of the building would usually require the user to go to the ground level. Therefore the LocationDetector might continue to return a cached sensor location until the altitude of the device returns to the expected ground level.

Detector Summary

In summary, the LocationDetector decides what location sensors are to be checked, and what order these location sensors are checked in. In some embodiments, the LocationDetector uses feedback from the OneShotContinuationCallback routine, as well as some optional hard-coded rules. For example, if all geofences meet the LOW power criterion and Wi-Fi is disabled, then only cell location sensors are used. In some embodiments, GPS is not checked initially due to power consumption and time delay. In some embodiments, cell location and Wi-Fi location are checked in parallel, rather than in series, because users are most often interested in locations like "home" or "work." Studies have shown that people spend 70% of their time in just a few locations, so it is highly likely that the user will be near a geofence and that Wi-Fi resolution will likely be necessary. This also has the advantage of working around incorrect cell location data by using the system's internal Wi-Fi calibration database.

Matcher

As described above, the matcher compares a sensor location with a geofence and determines whether the sensor location is inside or outside the geofence. In an ideal world, the sensor locations would be perfect and have zero ambiguity, allowing the matching algorithms to also have zero ambiguity. In such an ideal world, a matching algorithm implementation might simply require the sensor location be entirely within the geofence or perhaps require the sensor location center be within the geofence. In the real world, however, matching algorithms need to be adapted to work with noisy and inaccurate sensor location data.

The present invention's algorithm uses location and optionally time to determine whether a geofence has been matched as entered or exited.

Two pieces of information are used for location matching:
1) the distance between the sensor location and the geofence and
2) the sensor location accuracy compared to geofence size.

As explained earlier, the user's location is represented as a circular region, having a center and an accuracy, where the accuracy is a radius indicative of the perceived accuracy of the location detection method. Thus, the user's location may be described as having a "size", which is a circle having a center and a radius equal to the accuracy. Thus, the term "location size" refers to the area where the user may be, based on the sensor location and accuracy. Rules for determining accuracy for various location detection technologies have been described above.

To enter a geofence, the sensor location must be within some distance of the geofence. In addition, the sensor location accuracy must have a specific relationship to the geofence size.

Figure 3C:
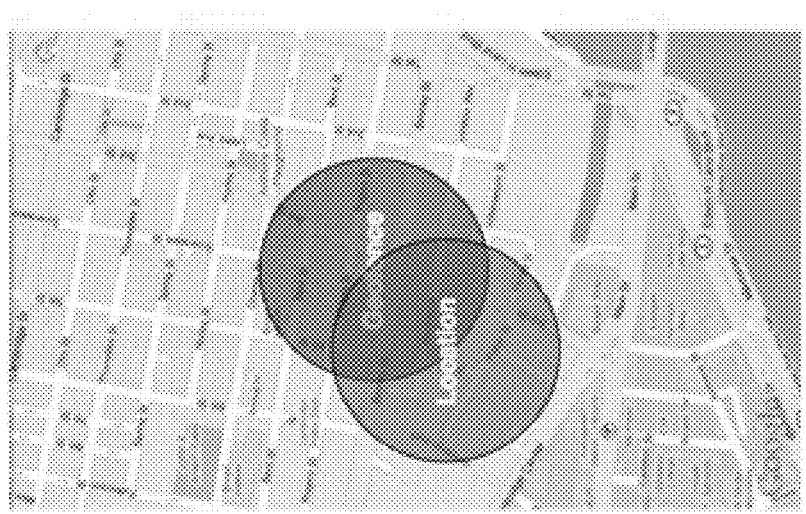
FIG. 3A-C show illustrations of a user entering a geofence.

In one embodiment, the sensor location center must be within the geofence radius and the relationship of sensor location accuracy to geofence size varies based on how close the sensor location center and geofence center are to one another. At one extreme, shown in FIG. 3A, the sensor location center is on the edge of the geofence. In this embodiment, the maximum accepted sensor location size is set to a first value. In some embodiments, this first value is defined to be no larger than the geofence size. At the other extreme, shown in FIG. 3C, the sensor location center is exactly the same as the geofence center. In this embodiment, the maximum sensor location size is set to a third value, where the third value is larger than the first value. In some embodiments, the third value may be several times larger than the geofence size.

Figure 3B:
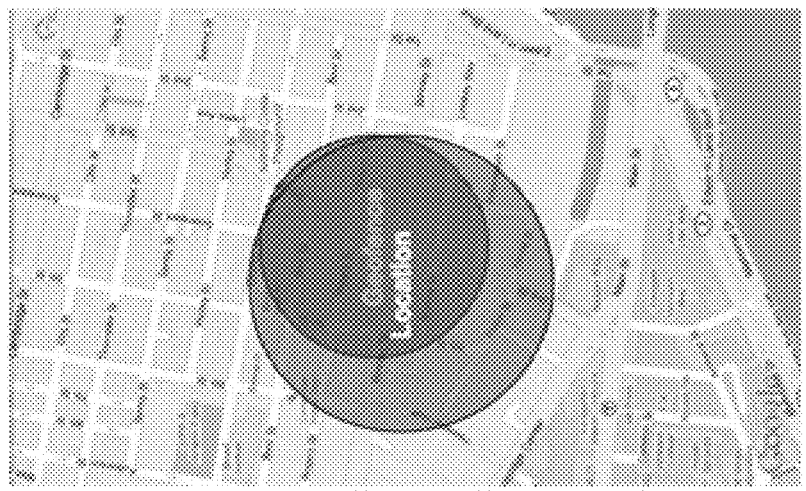
Figure 3A:
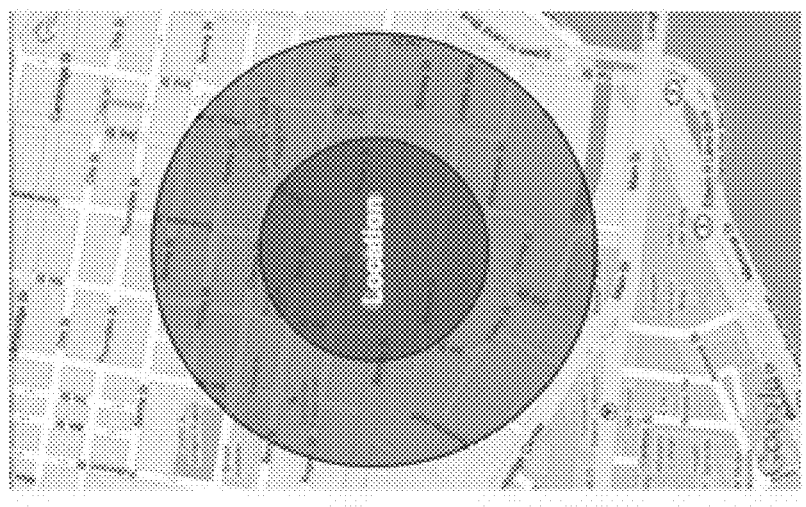

In one embodiment, the present invention defines the first value to be equal to the geofence size, and third value to be some scaling factor multiplied by the geofence size. The present invention then uses a linear scaling algorithm to interpolate intermediate values as the sensor location's center moves from the geofence edge (see FIG. 3A) to the geofence center (See FIG. 3C). For an intermediate location, such as is shown in FIG. 3B, the maximum location size may be defined to be twice the geofence size. Of course, other algorithms may be used which use the geofence size and center, and the location sensor size and center to determine when the user has entered or exited a geofence. For example, in another embodiment, the present invention divides the location size into two portions, that portion within the geofence and that portion outside the geofence. It compares the ratio of these two portions, referred to as an entry ratio, to determine when the user has entered the geofence. For example, the minimum ratio of the portion inside the geofence to the portion outside of the geofence may be defined as 1.00. A different ratio, referred to as the exit ratio, may be used to determine when the user has left the geofence. This exit ratio is smaller than the entry ratio. In another embodiment, a ratio of surface areas between the geofence and sensor location may be used.

Due to the difference in location sensor data, as evidenced in FIG. 1, it is possible that one location sensor may determine that the user is within a geofence, while another location sensor may not corroborate this. In addition, subsequent locations from the same sensor may change significantly even if the user is stationary. To handle the uncertainty inherent in location sensors and to minimize "bouncing" between entered and exited states for a geofence, the criteria used to exit a geofence may differ from that described above for entering a geofence. The location matching algorithm may use asymmetrical criteria, also known as hysteresis, to detect entering and exiting a geofence.

Figure 4:
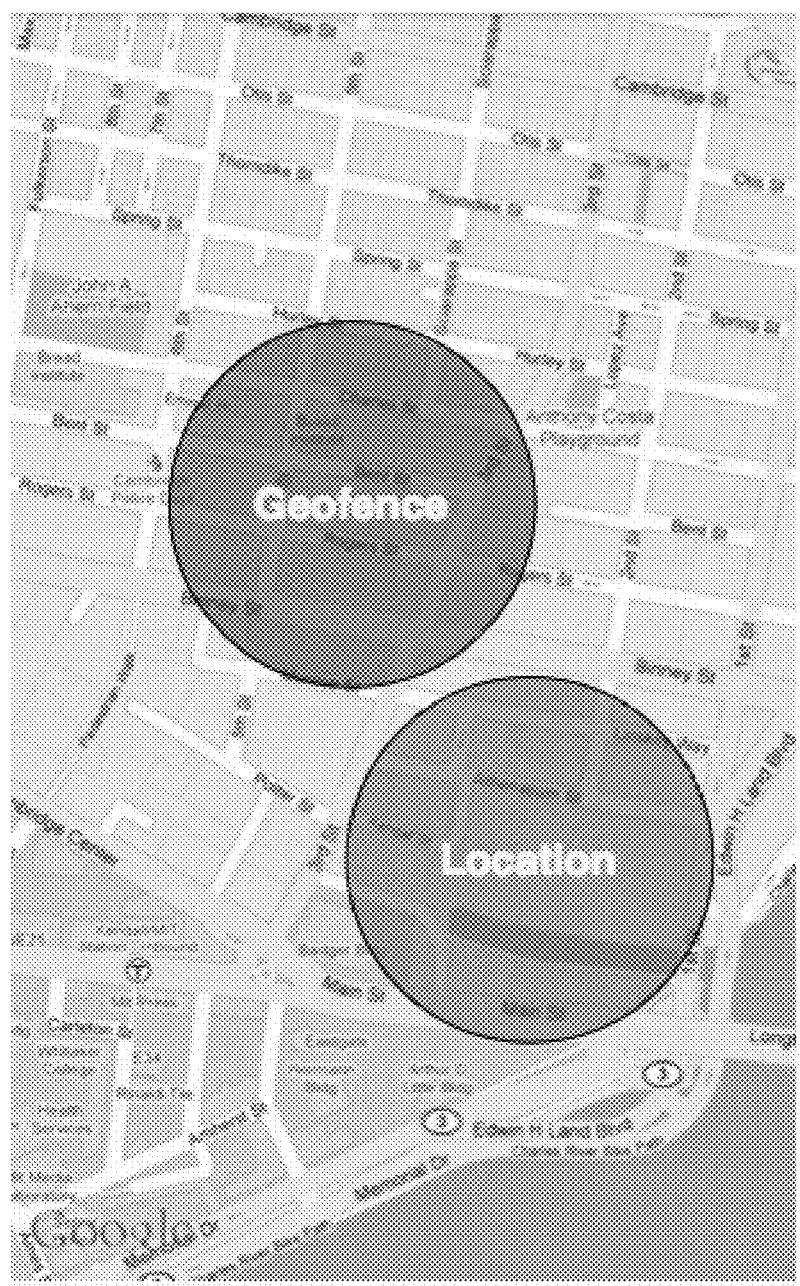
FIG. 4 shows an illustration of a user exiting a geofence.

In one embodiment, once the matcher of the present invention has determined that the user has entered a geofence, the matcher does not determine that the user has exited the geofence until the location size and geofence size have no overlap, as shown in FIG. 4. Of course, the present invention is not limited to this embodiment, the ratio of the portion of the location size inside the geofence to the portion outside of the geofence, described above, may also be used, where a first ratio is used to determine when a geofence has been entered, and a second ratio is used to determine when the geofence has been exited.

As mentioned above, asymmetry may be necessary to prevent accidentally entering and exiting a geofence due to incorrect or low accuracy sensor data or from rapidly switching between states. The following are several examples of how this can happen:

In one example, assume a user is walking into a building with his mobile device. The device gets a good sensor location using GPS just prior to entering the building and matches a 100 meter radius geofence for that building. Once inside the building, GPS becomes unavailable and only cell location data is available. The cell location data is very poor and puts the center of the sensor location 1,000 meters away with an accuracy of 1,200 meters. Using the asymmetric location matching algorithm, the geofence will not be accidentally exited when the user enters the building.

In a second example, the user may be in an area with marginal location coverage that causes frequent switching between different location technologies. For example, the user might be at home in the basement where there is cell coverage, but the user's home Wi-Fi access point is only sometimes within range. In this case, the best location sensor might switch between cell and Wi-Fi. Because of the asymmetric location matching algorithm, the home geofence will simply stay active. A similar problem could happen if the user is indoors near a window, where switching between cell and GPS is possible.

In a third example, the user may be near the edge of the geofence. Assume a user is in a large city like Boston or New York, where several amenities are close together. The user has a 100 meter radius geofence set up for work. The user enters a coffee shop half a block away from work. The coffee shop is on the edge of the work geofence. The sensor location readings are marginal and sometimes close enough to enter the work geofence while at other times neither close enough to enter nor far enough away to exit. In this case, the work geofence would be entered and stay entered. Although the user might not actually be at work, it is perceived that this behavior is the best compromise, because if the geofence blinks in and out, it may frustrate the user and not meet user expectations. The asymmetry of the location algorithm improves the user experience. This is especially true if the geofence is used for location-based reminders, as a user certainly would not want the device chiming incessantly because the device thinks the user is entering and exiting work repeatedly.

In addition to matching on location, there are a number of optional algorithms that may be used to improve the location matching algorithms using time.

For example, another embodiment, referred to as the Venus flytrap algorithm, requires some number of sensor locations match the geofence for a period of time before the geofence is considered to be entered. For example, assume a first sensor location matches a geofence. Rather than immediately enter the geofence, a second confirmation location sensor check is scheduled perhaps thirty seconds later. Only if that second sensor location also matches is the geofence considered entered. This is used to ensure that the user actually entered the geofence and was not simply near the geofence or just quickly passing through.

Another time-based algorithm monitors the user's movements. For example, if a geofence was recently exited, it cannot be entered again until some minimum predetermined entry period of time has elapsed. Similarly, if a geofence was recently entered, it cannot be exited again until some minimum predetermined exit period of time has elapsed. These predetermined entry and exit periods are referred to as entry refractory time and exit refractory time periods, respectively. Of course, other time-based rules can be incorporated.

The time component of the matching algorithms helps to alleviate a number of possible problems and improves the user's perception of the accuracy and reliability of the geofencing system. The following examples show improvement due to the time component:

Consider a user moving towards a geofence at home or work. Although the geofence is larger than the user's home or work building, the user generally spends all of his time at or near the center of the geofence rather than along its edge. Generally, the only time the user spends at the edge of the geofence is when the user is crossing the geofence to get to the center. As the user crosses the geofence on the way to the center, the geofence may activate. Although the asymmetric location matching algorithms discussed previously are designed to avoid rapidly switching between states at the edge of the geofence, it is possible for a bad sensor location to deactivate the geofence erroneously. The probability of getting a sufficiently bad sensor location decreases as the user approaches the center of the geofence. By preventing the geofence from activating or deactivating for some period of time, such as several minutes, the user is given a chance to reach the geofence center where the sensor locations may better match the geofence.

As described later, the present invention uses predictive algorithms to estimate when the user will arrive at a geofence. When a user exits a geofence, predictions on that geofence are disabled for a predetermined time period, such as several minutes. This prevents high frequency location checks that would otherwise occur. This improves power management and avoids draining the battery when the probability of re-entering the geofence for the next few minutes is low. After a few minutes, the user will likely be far enough away from the geofence to prevent high frequency location checks. For example, when a user is leaving work, he probably does not come back to work until the next day. Even when going out for lunch or coffee, the user is likely away from the geofence for more than a few minutes.

Consider a user who has a 100 meter radius geofence at home. The user lives in a city and relies on street parking. A typical return trip home involves the user driving to his home and entering the geofence. If there is no parking immediately outside his home, the user might drive a block or two away—exiting the geofence—to find parking before walking back home and reentering the geofence. By having entry and exit refractory time periods for the geofence, the geofence will be matched when the user arrives home and will stay matched while the user is parking. Thus a refractory period prevents rapid entering and exiting the home geofence when, for all practical purposes, the user is at home the entire time.

Consider a user who has a 100 meter geofence. The user may graze the edge of the geofence on the way to another destination. If the user is driving, the amount of time the user spends inside the geofence will only be a few seconds. By requiring confirmation before entering a geofence as described in the Venus flytrap algorithm, the geofence is not activated when the user is not intending to enter the geofence.

Scheduler

In order to save battery power, mobile devices may implement aggressive sleep policies. When a resource is not in use, it is often turned off. For example, the display of the device turns off after a few minutes of inactivity. Similarly, the device's CPU may be turned off or throttled when it is not being used. On various mobile devices, the applications resident in the device are effectively suspended while the device is asleep. To perform work while the device is asleep, an application would schedule a wakeup prior to falling asleep. When a wakeup message is delivered, an application acquires a WakeLock resource and holds that resource for as long as it wants to keep the CPU awake.

The scheduler of the present invention decides when it wants to receive a wakeup in order to perform the next active one-shot location check. The scheduler may be in one of three modes:
1) Predictive polling mode, which schedules one-shot updates based on how far away each geofence is from the sensor location,
2) non-predictive polling mode, which schedules fixed period updates, and
3) idle mode.

Many existing geofencing systems use a fixed polling mechanism to detect entering a geofence. For example, a fixed polling mechanism might check for location every ten minutes. Fixed polling has two major shortcomings:

It wastes battery power. If the device is in San Francisco but the geofence is in Boston, fixed polling would continue checking location every few minutes even though the geofence could not possibly be entered for several hours.

It introduces latency. Suppose a poll occurs just before entering the geofence, and then the device enters the geofence. Entrance into the geofence will not be detected until the next polling interval.

Rather than poll for location on a fixed schedule, in some embodiments, the present invention uses a variable schedule based predictively on the distance between the device's sensor location and the nearest geofence. Predictive polling is significantly more efficient and lower latency than fixed polling. The present invention uses a series of algorithms to implement its predictive poller. In each of these algorithms, the goal is to predict exactly when the device will arrive at a geofence. When there is a choice between overestimating the time of arrival (e.g. predicting too late) or underestimating the time of arrival (e.g. predicting too soon), in some embodiments, the algorithms choose to underestimate to ensure that notification that the geofence has been entered is not missed or delayed.

To predict when a device might arrive at a geofence, the present invention needs to know (1) the distance between the sensor location and the closest geofence and (2) the speed of the device. As the device gets closer to the geofence, the present invention will check for location more frequently with the next poll scheduled exactly when arrival is predicted to occur.

Progressive Refinement

To determine the distance between the sensor location and the closest geofence, the present invention uses artificial intelligence techniques, combined with the matching algorithms described previously, to progressively refine the predicted approach. In some embodiments, the progressive refinement occurs in three stages:
1) Edge-to-edge: When the sensor location is completely outside the geofence, then the intersection of the edges is the earliest possible arrival. Because the accuracy of a sensor location represents the possible error in the location detection, the device's actual location could be anywhere within the circle. This is especially true with cell locations. Therefore, predicting when the edges will connect is the earliest possible time that the device could arrive at the geofence.
2) Center-to-edge: After the sensor location edge intersects the geofence edge, the next stage is predicting when the sensor location center will reach the geofence edge. This stage is based on the requirement of the matching algorithm, that the sensor location center be within the geofence.
3) Center-to-matched: Once the sensor location center is inside the geofence, the geofence might have already matched depending on the accuracy of the sensor location. If it does not match, the algorithm determines how much closer the centers would need to be in order for the matching algorithm to be met (if the sensor location is too inaccurate to ever match, then the distance between the centers is used).

In other embodiments, different rules are used to progressively refine the geofence approach. Some embodiments may only utilize a subset of the refinement stages described above, such as only using stages two and three.

In other embodiments, the predictive refinement may always predict a sequence of fixed times or distances away from the geofence, rather than use the relationship of sensor location distance and accuracy compared to the geofence distance and accuracy. For example, such a system might attempt to detect when the device is 1 minute away, then 30 seconds away, and finally detect arrival. As an alternative example, such a system might attempt refinement by detecting when the device is 1000 meters away, 500 meters away, and finally detect arrival.

In some embodiments, the above implementations utilize line of sight calculations, which typically underestimates arrival time, since travel is rarely line of sight. An alternative approach may include using transit directions or using information about roads and maps to estimate actual travel time or distance. For example, various navigation applications may be used to estimate time from the present location to a fixed remote point. In addition, real time traffic information can be used to further improve the accuracy of these calculations.

Two different sources are used to estimate speed: speed measurements coming directly from the location sensor and a history of previous locations. In some embodiments, if the system determines the mode of transit being used by the mobile device, such as walking, driving, biking, etc., then an estimated speed of that mode of transit could be used to set a minimum bound on the speed of the device. This is particularly useful if the sensor does not report speed and/or the history of previous locations is inaccurate. For example, a device might be moving quickly within the radius of a cell tower location but may be unable to determine a speed because it has not moved far enough for the cell location to change. From a historical perspective of sensor locations, the device might appear stationary.

GPS and some other location sensors can provide speed along with latitude, longitude, accuracy, and other location data. Not all sensors provide speed estimates however. The sensor speed is the instantaneous speed of the device. While driving, the user may stop and start at any time, such as at a traffic light. The instantaneous speed does not necessarily determine the arrival time of the device, because the average speed could be significantly less than the instantaneous speed.

In some embodiments, the present invention maintains a history of some number of previously determined locations. By simply taking the distance between the centers of these locations and the time between their measurements, an estimate of speed can be determined. In another embodiment, the distance between the farthest edges of each consecutive location is used, in order to overestimate the speed of the device. A major advantage of historical speed estimates is that they are generally available regardless of the location sensor used. Some location sensors, like Wi-Fi or cell network based locations, do not provide speed estimates. In these cases, historical speed estimates provide an alternative. Another advantage of historical speed estimates over instantaneous sensor speed estimates is that they capture an average speed over time. For example, assume a user is driving towards a geofence. If the user stops at a traffic light, the historical speed estimate will accurately predict when the user will arrive at the geofence much better than the instantaneous sensor speed, because the historical speed estimate can better capture traffic conditions.

In some embodiments, once the device is inside a geofence, periodic polling, rather than predictive polling, is used to determine when the geofence is exited. In some embodiments, polling occurs about once every ten minutes in order to detect an exit from the geofence. In other embodiments, the periodic polling schedule may dynamically adjust based on any number of factors. For example, the polling schedule may be reduced if the battery is low. Or the polling schedule may be adjusted based on the battery usage of previous polls. For example, if cell or Wi-Fi is used for polling, then polling might occur more frequently. If GPS is used for polling, then polling might occur less frequently.

Idling

To improve battery efficiency, the scheduler may also enter an idle mode based on different sensors. Additionally, the scheduler may enter an idle mode based on time and/or day of week.

As discussed earlier, some cell carriers support network-centric location detection and geofencing based on the visibility of the device to different cell towers. In some embodiments, the scheduler enters an idle mode until the application receives a push notification from the cell network that the device is entering or exiting a geofence. This notification from the network then triggers the device-centric geofencing algorithms as described previously in order to obtain a better sensor location. Device-centric location sensors are often more accurate than network-centric location. Thus network-centric geofencing is another example of progressive deepening, where a less accurate but lower power location technology is used before more accurate but higher power location technology.

Although the only way for an application to guarantee that the processing unit is awake is by acquiring a WakeLock, most mobile devices frequently wake the processing unit to perform a number of housekeeping tasks for other system services or other applications. If an application registers a listener for the accelerometer sensor, the application will receive accelerometer data whenever the processing unit is awake for any reason. Although the frequency of these wake ups is undefined, typically they occur every few minutes. In one embodiment, the present invention may register a listener for the accelerometer and passively monitor for movement of the device. If the device has not moved for a period of time, the scheduler is put into an idle mode and no polling occurs until the device is moved again.

In some embodiments, the present invention uses an algorithm to simply detect whether the angle of the device changes. If the angle of the device has not changed for a period of time, the device is considered stationary. This allows the present invention to detect when the device is left flat on a table or left in a bag. If the device is in the user's pocket, then minor movements from the user will likely prevent the present invention from detecting the device as being idle.

In another embodiment, the barometer or altimeter of the device may be monitored passively to detect when the user is entering or exiting a tall building. As described previously, if the altitude of the device is significantly higher than the expected ground level altitude of the device based on the latitude and longitude detected by the location sensors, it might be assumed that the user is within a tall building. When in a tall building, significant lateral movement beyond the footprint of the building would usually require the user to go to the ground level. Thus if the air pressure or altitude of the device indicates the user is in a tall building, the scheduler may passively monitor the barometer and enter an idle mode until the device returns to the ground level.

In another embodiment, non-location sensors, such as the accelerometer, barometer, altimeter, gyroscope, microphone, camera or other sensors, may be able to monitor the environment independently of the processing unit. This allows the sensors to be monitored continuously, only waking the processing unit when a change is detected.

For example, in some embodiments these non-location sensors may be able to determine the user's current type of activity with very low power usage. In some embodiments, the geofencing algorithms may enter an idle mode for certain types of activity and exit idle mode when the user's activity changes. For example, often geofences are configured for places such as home or work. If the sensors detect the device is being driven, based on sensor data, such as accelerometer data, it may enter idle mode until it detects the user is walking again as the user would walk from the car to his home or work location.

In another embodiment, non-location sensors such as the compass, accelerometer, and gyroscope may be used to perform dead reckoning relative to the last sensor location obtained by the LocationDetector. Such a dead reckoning algorithm would be able to estimate the distance and direction the device has traveled relative to a last known position, thus enabling the location of the device to continue to be estimated without using the absolute location sensors such as cell, Wi-Fi, or GPS. In some embodiments, the scheduler enters an idle mode until the dead reckoning algorithm detects the device has moved a certain distance from its last known location. In other embodiments, the location determined by the dead reckoning algorithm is fed into the matcher and triggers a one-shot location when the dead reckoning based location would cause the matched locations to change.

In another embodiment, Wi-Fi signals may be used to detect when the device is relatively stationary. When a device performs a Wi-Fi scan, it "sees" the Wi-Fi access points that are nearby, along with their associated signal strengths. Significant changes to the number of Wi-Fi access points or their signal strengths could indicate the device is moving. Since Wi-Fi has limited range, if the visible access points or their signal strengths do not change, then there is a good chance that the device is not moving. However, access points that are further away or have a weak signal may blink in and out of visibility. To prevent this blinking from falsely looking like movement, one of several strategies could be used. For example, one might look at a percentage of access points that did not change. Suppose the device performs a scan and sees 20 Wi-Fi access points. If some percentage of those access points are still visible at the next scan, the device probably is not moving. Another strategy might be to filter out access points with low signal to reduce the likelihood of seeing them blink in and out. In another embodiment, hysteresis based on signal strengths is used to suppress blinking Wi-Fi access points. In such an embodiment, a certain signal strength is required to begin tracking a Wi-Fi access point, and a different signal strength to stop tracking a Wi-Fi access point.

In another embodiment, cell towers are monitored in the same way as previously described for Wi-Fi.

Unlike Wi-Fi, the available mobile operating systems do not generally inform an application about all of the cell towers within range of the device. Instead, an application typically obtains information about the tower that the device is currently connected to. As the device shifts between towers or the signal strength changes, applications are notified of that change. When a device is stationary, a device may switch between any number of nearby towers. Therefore, within a predetermined period of time, a device will usually have connected to most of the towers within the range of a given location. If the system keeps track of each tower that it connects to and when, it can detect when it sees a different tower. In some embodiments, if the device detects a new tower after not detecting a new tower for a predetermined period of time, this may be used to indicate the device is moving. In other embodiments, towers the device has previously seen are aged out after a predetermined period of time.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method for determining when a user enters a predetermined region, where the user's present location is represented by a first circle having a first center and a first radius, where said first center represents a location indicated by a location sensor and said first radius is indicative of the accuracy of said location sensor and the predetermined region is represented by a second circle having a second center and a second radius, comprising:
  determining, using said location sensor, when said user may have entered said predetermined region based on a distance from said first center to an edge of said predetermined region;
  calculating, after said determining, a maximum allowable first radius, where the maximum allowable first radius defines the accuracy of the location sensor required to indicate that the user is within the predetermined region, wherein the maximum allowable first radius is determined based on the second radius and increases as the distance between the first center and the second center decreases; and
  determining when said user is within the predetermined region when the first radius is less than the maximum allowable first radius,
  wherein the maximum allowable first radius is defined to be equal to the second radius when the first center reaches the edge of the second circle and is defined to be equal to a predetermined scaling factor multiplied by the second radius when the first center matches the second center, wherein the predetermined scaling factor is greater than 1.

2. The method of claim 1, wherein the maximum allowable first radius is linearly scaled as the first center moves toward the second center.

3. The method of claim 1, further comprising determining the user has left the predetermined region when there is no overlap between the first circle and the second circle.

4. The method of claim 1, further comprising determining when the user has left the predetermined region when a ratio of a portion of said first circle that overlaps said second circle divided by a portion of said first circle that does not overlap said second circle is less than a threshold, wherein the threshold is referred to as the exit ratio.

5. A method for determining when a user enters a predetermined region, where the user's present location is represented by a first circle having a first center and a first radius, where said first center represents a location indicated by a location sensor and said first radius is indicative of the accuracy of said location sensor and the predetermined region is represented by a second circle having a second center and a second radius, comprising:
  determining, using said location sensor, when said user may have entered said predetermined region based on a distance from said first center to an edge of said predetermined region;
  calculating, after said determining, a maximum allowable first radius, where the maximum allowable first radius defines the accuracy of the location sensor required to indicate that the user is within the predetermined region, wherein the maximum allowable first radius is determined based on the second radius and increases as the distance between the first center and the second center decreases; and
  determining when said user is within the predetermined region when the first radius is less than the maximum allowable first radius,
  wherein the maximum allowable first radius is defined to be equal to the second radius when the first center reaches the edge of the second circle and
  wherein the maximum allowable first radius is linearly scaled as the first center moves toward the second center.

6. The method of claim 5, further comprising determining the user has left the predetermined region when there is no overlap between the first circle and the second circle.

7. The method of claim 5, further comprising determining when the user has left the predetermined region when a ratio of a portion of said first circle that overlaps said second circle divided by a portion of said first circle that does not overlap said second circle is less than a threshold, wherein the threshold is referred to as the exit ratio.

8. A method for determining when a user enters a predetermined region, where the user's present location is represented by a first circle having a first center and a first radius, where said first center represents a location indicated by a location sensor and said first radius is indicative of the accuracy of said location sensor and the predetermined region is represented by a second circle having a second center and a second radius, comprising:
  determining, using said location sensor, when said user may have entered said predetermined region based on a distance from said first center to an edge of said predetermined region;
  calculating, after said determining, a maximum allowable first radius, where the maximum allowable first radius defines the accuracy of the location sensor required to indicate that the user is within the predetermined region, wherein the maximum allowable first radius is determined based on the second radius and increases as the distance between the first center and the second center decreases;

determining when said user is within the predetermined region when the first radius is less than the maximum allowable first radius; and determining when the user has left the predetermined region when a ratio of a portion of said first circle that overlaps said second circle divided by a portion of said first circle that does not overlap said second circle is less than a threshold, wherein the threshold is referred to as the exit ratio.

9. The method of claim 8, wherein the maximum allowable first radius is defined to be equal to the second radius when the first center reaches the edge of the second circle.

* * * * *